Jan. 27, 1942.   H. A. SMITH ET AL   2,271,233
INSULATED ELECTRICAL CONDUCTOR
Filed Sept. 1, 1938

Fig.1.

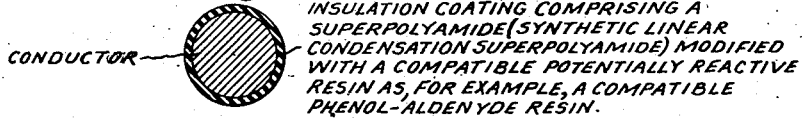

CONDUCTOR

INSULATION COATING COMPRISING A SUPERPOLYAMIDE (SYNTHETIC LINEAR CONDENSATION SUPERPOLYAMIDE) MODIFIED WITH A COMPATIBLE POTENTIALLY REACTIVE RESIN AS, FOR EXAMPLE, A COMPATIBLE PHENOL-ALDEHYDE RESIN.

Fig.2.

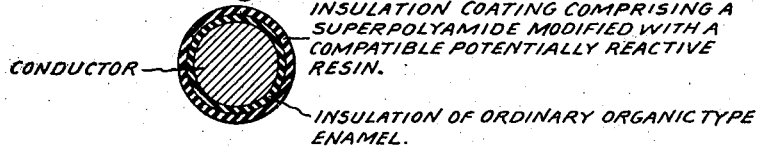

CONDUCTOR

INSULATION COATING COMPRISING A SUPERPOLYAMIDE MODIFIED WITH A COMPATIBLE POTENTIALLY REACTIVE RESIN.

INSULATION OF ORDINARY ORGANIC TYPE ENAMEL.

Fig.3.

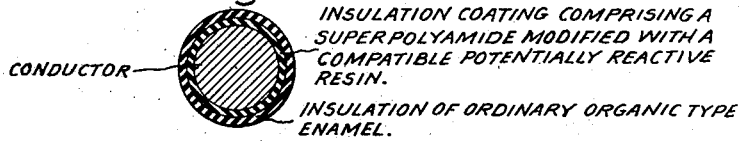

CONDUCTOR

INSULATION COATING COMPRISING A SUPERPOLYAMIDE MODIFIED WITH A COMPATIBLE POTENTIALLY REACTIVE RESIN.

INSULATION OF ORDINARY ORGANIC TYPE ENAMEL.

Fig.4.

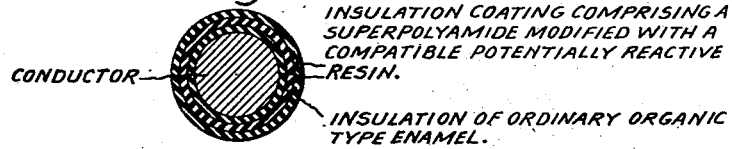

CONDUCTOR

INSULATION COATING COMPRISING A SUPERPOLYAMIDE MODIFIED WITH A COMPATIBLE POTENTIALLY REACTIVE RESIN.

INSULATION OF ORDINARY ORGANIC TYPE ENAMEL.

Inventors:
Henry A. Smith,
Edward H. Jackson,
by Harry E. Dunham
Their Attorney.

Patented Jan. 27, 1942

2,271,233

UNITED STATES PATENT OFFICE 2,271,233

INSULATED ELECTRICAL CONDUCTOR

Henry A. Smith and Edward H. Jackson, Fort Wayne, Ind., assignors to General Electric Company, a corporation of New York Application September 1, 1938, Serial No. 227,981

19 Claims. (Cl. 174—125)

This invention relates to insulated electrical conductors and more particularly is concerned with the manufacture of insulated electrical conductors having insulation of the organic enamel type thereon.

In accordance with the present invention metallic conductors are insulated with a composition produced by suitably combining a synthetic linear condensation superpolyamide with a compatible potentially reactive (heat-hardenable) resin as, for example, a compatible phenol-aldehyde resin. The insulation coating is hard, tough, flexible, abrasion-resistant and resistant to attack by such agencies as oil, varnish and the like. It also has a high dielectric strength.

Synthetic linear condensation superpolyamides are described, for example, in British Patents 461,236 and 461,237. As stated in British Patent 461,236 superpolyamides can be obtained by suitable heat treatment of one or more monoamino-monocarboxylic acids having amino carboxylic acid radicals attached to the carbon atoms that are most remote from each other and contain no substituent groups other than hydrocarbon radicals. Superpolyamides also can be prepared by suitably heating esters of such monoamino-monocarboxylic acids, or low molecular weight polyamides obtainable from said acids or their esters, or mixtures of the foregoing substances. As pointed out in British Patent 461,237 superpolyamides also are derived from the reaction of diamines of the formula $NH_2CH_2RCH_2NH_2$ and dicarboxylic acids (and their amide-forming derivatives) of the formula $$HOOCCH_2R'CH_2COOH$$

in which R and R' are divalent hydrocarbon radicals and in which R has a chain length of at least two carbon atoms. Within this class the most desirable superpolyamides in carrying the present invention into effect are prepared from diamines of the formula $NH_2(CH_2)_xNH_2$ and dicarboxylic acids of the formula $$HOOC(CH_2)_yNH_2$$

in which $x$ is at least 4 and $y$ at least 3. A preferred superpolyamide is a reaction product of hexamethylene diamine and adipic acid. Superpolyamides produced in accordance with either of the above British patents are capable of being drawn or spun into continuous filaments. These filaments may be made into the form of threads or yarns of varying thicknesses, or into felted or woven sheets, tapes or the like. These superpolyamides also may be converted into smooth-surfaced continuous sheets, tapes, etc.

The term "superpolyamide" as used generally herein is intended to include within its meaning the products described briefly above and more fully in, for example, the aforesaid British patents.

The novel features of our invention are set forth in the appended claims. The invention itself, however, will be understood most readily from the following description when considered in connection with the accompanying drawing in which—

Fig. 1 is a cross-sectional view of an electrical conductor provided with insulation in accordance with our invention;

Fig. 2 is also a cross-sectional view showing the conductor provided with a coating of insulation of ordinary organic type enamel and a superimposed coating of the new insulating material herein described;

Fig. 3 is another cross-sectional view illustrating a further modification of the invention; and Fig. 4 is also a cross-sectional view showing a still further modification of the invention.

In order that those skilled in the art better may understand how this invention may be carried into effect, the following illustrative examples of the preparation of a suitable modifying resin, specifically a phenol-aldehyde resin, are given, together with a more complete description of how such resin preferably is incorporated with a superpolyamide in making the new compositions:

EXAMPLE 1

PREPARATION OF MODIFYING RESIN

| | Parts by weight |
|---|---|
| Cresol | 750 |
| Aqueous solution of formaldehyde (approximately 37.2% HCHO) | 448.4 |
| Triethanolamine (commercial grade) | 23.9 |

The cresol preferably is meta-para cresol, water white, and containing approximately 50 to 55 per cent meta-cresol, the remainder para-cresol and xylenols. It will be noted that in the foregoing formula the cresol and formaldehyde are in the ratio of 1 mole cresol to approximately 0.8 mole dry formaldehyde.

The materials are charged into a suitable reaction vessel or kettle provided with a reflux condenser, and are stirred and reacted at atmospheric pressure at the boiling point (approximately 94° to 98° C.). The reaction is allowed to proceed until incipient precipitation of the resin occurs as indicated by the cloudiness of the solution. Ordinarily this point will be reached in about 2 hours. The mass is cooled to about 30° C., after which it is dehydrated, preferably under reduced pressure with the external application of heat. The maximum temperature attained during dehydration is not permitted to exceed substantially 80° C. After dehydrating, a clear, amber, very viscous liquid (at 80° C.) results. It is semi-solid at room temperature.

The dehydrated resin is dissolved or dispersed in a suitable volatile solvent. Preferably cresol, which is an organic hydroxy compound and more particularly an organic aromatic hydroxy compound, is added to the hot (80° C.) liquid resin in the reaction vessel in an amount such that the resulting solution contains approximately 50 per cent cresol-formaldehyde resin and 50 per cent cresol as solvent. It is convenient to use as solvent meta-para-cresol such as is employed in the manufacture of the resin. The mixture is well stirred, cooled to room temperature and removed from the reaction vessel for subsequent use in making wire enamels.

PREPARATION OF WIRE ENAMEL

*Materials*

Superpolyamide obtained by reacting hexamethylene diamine and adipic acid, for instance as described under Example 2 of British Patent 461,237.

Cresol solution of cresol-formaldehyde resin made as described above.

Solvents: Meta-para-cresol such as used for dissolving the cresol-formaldehyde resin, and solvent naphtha such, for example, as a crude coal-tar naphtha designated in the trade as "No. 100 Heavy Naphtha" and commonly known as "wire enamel naphtha." Such naphtha, which is a hydrocarbon and is compatible with the meta-para-cresol, usually has a distillation range of 155° to 290° C., with 75 to 85 per cent distilling off at 200° C.

*Formula*

Solids 16%, composed of:      Per cent by weight
  Cresol-formaldehyde resin _____  5.33
  Superpolyamide _____ 10.67
Solvents 84%, composed of:
  Cresol* _____ 25.20
  Naphtha _____ 58.80

*Note.—A part of this cresol is added to the dehydrated resin in the reaction vessel.

The proper amounts of naphtha and cresol are weighed into a mixing tank and agitated, the 50-50 cresol solution of cresol-formaldehyde resin is added, and the whole is well mixed. The solid superpolyamide is added slowly, and the mixture stirred until the superpolyamide is completely dissolved. The resulting enamel is clear, homogeneous and viscous. It may be dyed, if desired, by adding a small amount of a suitable dye and stirring until the dye is dissolved. Preferably the enamel is filtered through a pressure filter prior to use for enameling wire.

The following examples are illustrative of other formulas for preparing the modifying resin:

EXAMPLE 2

Same formula and general procedure as described under Example 1, with the exception that in lieu of triethanolamine 23.9 parts by weight of morpholine is used as catalyst. The dehydrated resinous mass is a clear, amber, viscous liquid.

A wire enamel is made of the dehydrated resin in essentially the same manner as described under Example 1.

EXAMPLE 3

Parts by weight
Phenol _____ 750
Aqueous solution of formaldehyde (approximately 37.2% HCHO) _____ 643.3
Triethanolamine (commercial grade) _____ 25.8

Essentially the same process is followed in making the resin as described under Example 1. The dehydrated resin is a clear, amber solid.

A wire enamel is made of the dehydrated resin in essentially the same manner as described under Example 1.

It is to be noted that in the formula of this example the phenol and formaldehyde are reacted in approximately equimolecular proportions.

The properties of the modifying resin, and therefore the properties of the phenol-aldehyde-superpolyamide composition, may be varied by varying the ratios of the phenolic body and the aldehyde. This is shown in the following table wherein is set forth the properties of resinous condensation products obtained by reacting different mole ratios of meta-para-cresol and an aqueous solution of formaldehyde, using the same percentage of triethanolamine (2.54%) and essentially the same procedure as described under Example 1.

TABLE I

| Meta-para cresol (mole) | HCHO (mole) | Appearance of dehydrated resin | Time sample (15 g. in 30 cc. crucible) was heated at 105° C. | | Appearance of hard (cured) infusible, insoluble resin |
|---|---|---|---|---|---|
| | | | To form a stiff gel (hot), hours | To form a hard resin (hot), hours | |
| 1 | 2 | Clear, amber solid | ¾ | 2 | Amber, transparent, tough |
| 1 | 1 | Clear, amber semi-solid | 1¼ | 4½ | Do. |
| 1 | 0.9 | ___do___ | 1½ | 5½ | Do. |
| 1 | 0.7 | Clear, amber viscous | 3½ | 16 | Do. |
| 1 | 0.6 | ___do___ | 6½ | Did not harden beyond a very stiff gel even after two weeks' heating | |
| 1 | 0.5 | ___do___ | Surface formed a very tough skin after a short time but the resin itself never hardened beyond a viscous solution (hot) even after two weeks' heating | | |

As shown in the table, resins containing 0.7 or more moles formaldehyde will convert to a substantially infusible, insoluble state when heated at an elevated temperature, whereas those containing 0.5 or 0.6 mole formaldehyde are thermoplastic. While for certain applications such thermoplastic resins may be used as modifying agents of superpolyamides in general we prefer to use in the preparation of wire enamels those phenolic resins which are produced by reacting 1 mole phenolic body with from 0.7 to 2.0 moles of an active methylene-containing body such as formaldehyde or other suitable aldehyde. No particular advantage is gained by using more than 2 moles formaldehyde to 1 mole of the phenolic body, since the excess formaldehyde is volatilized during the cooking of the resin.

Enameled wires are produced by drawing the clean wire, for example clean copper wire, through a bath of wire enamel made by incorporating the modifying heat-hardenable resin with a superpolyamide and solvent as more particularly set forth under Example 1. The proportions of modifying resin and superpolyamide may be varied, depending upon the particular materials employed and the particular properties desired in the end-product. For example, wire enamels can be made wherein the proportions vary from, by weight, about 5 to 50 parts phenolic resin to from about 95 to 50 parts superpolyamide. The ratio of the total solids to solvent also may be varied, for instance, from about 5 to 25 parts solids to about 95 to 75 parts solvent. We prefer to use a phenolic resin-superpolyamide ratio and a total solids to solvent ratio such as described under Example 1, since the particular combination of ingredients there described has been found to produce a wire enamel which is most readily and effectively applied to wire, and to yield an insulated wire having the most desirable combination of properties.

Having passed the wire through a bath of wire enamel made as above described, the coated wire is subjected to heat, for instance by introducing it into a suitable oven or chamber wherein the enamel coating is baked at a suitable temperature, for example at an oven temperature of about 250° to 500° C. The coating is baked simultaneously with the annealing of the copper. Usually it is necessary to run the wire through the enamel bath and baking oven several times in order to provide adequate insulation thereon. Baking advances the phenol-aldehyde component of the coating to the infusible insoluble state, and likewise improves the properties of the superpolyamide. Specifically, the electrical insulating properties and the hardness, abrasion resistance and resistance of the coating to attack by oils, solvents, varnishes and various chemicals are improved by such treatment.

It is to be understood that this invention is not limited to the application of the new insulating composition directly upon the conductor, as shown in Fig. 1. For example, a coating of the new insulation may be applied over a coating of regular enamel, as shown in Fig. 2. The modified superpolyamide adheres tenaciously to the underlying enamel film, and protects the latter from abrasion and from embrittlement which otherwise results upon prolonged exposure to heat. Also, if desired, a conductor may be provided first with a coating of the phenolic resin-modified superpolyamide, followed by one or more coatings of ordinary enamel, as shown in Fig. 3. In this way the adherence of the ordinary organic enamel is improved. Thereafter an outer coating or coatings of the modified superpolyamide may be put on, as shown in Fig. 4.

While we have described the preparation of the phenolic modifying resin which is incorporated with a superpolyamide with particular reference to phenol or cresol, it will be obvious to those skilled in the art that other phenolic bodies also may be used. For example, we may use xylenols; or mixtures of phenol and cresol; or mixtures of phenol or cresol, or phenol and cresol together with wood oil phenolic bodies of the kind described more fully in the co-pending application of Edmond F. Fiedler and Allan Sheppardson, Serial No. 212,500, filed June 8, 1938, which has matured to Patent No. 2,221,511 dated November 12, 1940, and assigned to the same assignee as the present invention. Likewise, active methylene-containing bodies other than formaldehyde may be used, either in solid or solution state. If desired, paraformaldehyde may be employed in place of an aqueous solution of formaldehyde and the reaction and dehydration may be carried out in an open vessel instead of as described under Example 1. While we prefer to use an organic alkaline catalyst such as ethanolamines, specifically triethanolamine, or morpholine, inorganic alkaline catalysts also may be employed, for example, the cyanides, hydroxides and carbonates of the alkali metals as, for instance, sodium or potassium hydroxide, carbonate or cyanide.

Although the heat-hardenable-resin-modified superpolyamide herein described is particularly applicable to the manufacture of wire enamels and insulated conductors, it will be appreciated that its field of utility is not limited thereto. For example, it may be used as an adhesive for cementing together such materials as mica flakes to form bonded mica sheet insulation. It also may be used as an agent for impregnating or bonding together organic or inorganic fibrous materials in sheet, tape, felted or other form. It also may be employed as a coil-impregnating varnish.

The herein-described modified superpolyamide may be made in the form of thin sheets or tapes and used alone, or adhesively bonded to, or otherwise in combination with other materials such as paper, cellulose esters, cellulose ethers, etc. and the composite sheet material used, for example, as coil layer insulation. Such sheets or tapes also may be applied to a conductor, according to well-known strip-covering methods, as insulation therefor. They may be heat treated to improve their properties either before, during or after application. The modified superpolyamide of this invention also may be suitably associated for certain uses with fibrous inorganic materials, such as asbestos, spun glass, mineral wool, etc., as described, for example, in the co-pending application of Ralph W. Hall and Henry A. Smith, Serial No. 227,894, which has matured to Patent No. 2,260,024 dated October 21, 1941, filed concurrently herewith and assigned to the same assignee as the present invention.

What we claim as new and desire to secure by Letters Patent of the United States is:

1. An insulated electrical conductor in which the insulation comprises a heat-hardenable-resin-modified superpolyamide heat-treated in place to produce a hard, flexible, tough, abrasion-resistant insulation.

2. An electrical cable comprising an electrical conductor having superposed directly thereon a hard, flexible, tough, abrasion-resistant coating of high dielectric strength, said coating being the product of heat treating in place a mixture of a superpolyamide, obtained by reacting hexamethylene diamine with adipic acid, and from 5 to 50 per cent by weight of the said mixture of a heat-hardenable resin obtained by condensing cresol with formaldehyde in the ratio of 1 mole cresol to at least 0.7 mole formaldehyde and in the presence of an alkaline catalyst.

3. A wire enamel comprising a volatile solvent and a composition comprising a superpolyamide having incorporated therewith from 5 to 50 per cent by weight of the said composition of a compatible heat-hardenable, alkaline-catalyzed phenol-aldehyde resin.

4. A wire enamel comprising a volatile solvent and a composition comprising a superpolyamide, obtained by reacting hexamethylene diamine with adipic acid, and from 5 to 50 per cent by weight of the said composition of a heat-hardenable resin obtained by reacting cresol with formaldehyde in the ratio of 1 mole cresol to at least 0.7 mole formaldehyde and in the presence of an alkaline catalyst.

5. Electrical insulation consisting of a heat-treated composition comprising a superpolyamide having incorporated therewith a compatible heat-hardenable, alkaline-catalyzer, cresol-formaldehyde resin, said composition being hard, flexible, tough and abrasion-resistant.

6. An electrically insulating material comprising a hard, tough, flexible, abrasion-resistant composition obtained by heat treatment of a mixture comprising a superpolyamide and from 5 to 50 per cent by weight of the mixture of a heat-hardenable resin compatible with the superpolyamide and obtained by reacting cresol with formaldehyde in the ratio of 1 mole cresol to at least 0.7 mole formaldehyde and in the presence of an alkaline catalyst.

7. An electrically insulating material comprising a hard, tough, flexible abrasion-resistant composition obtained by heat treatment of a mixture comprising (1) a superpolyamide obtained by reacting hexamethylene diamine with adipic acid and (2) from 5 to 50 per cent by weight of the mixture of a heat-hardenable resin compatible with the said superpolyamide and obtained by reacting cresol with formaldehyde in the ratio of 1 mole cresol to at least 0.7 mole formaldehyde and in the presence of an ethanolamine as catalyst.

8. The method of insulating a wire which comprises coating the wire with a wire enamel comprising a solution of a superpolyamide having incorporated therewith a compatible heat-hardenable resin and baking the coated wire to produce a hard, flexible, tough, abrasion-resistant insulation.

9. The method of insulating a wire which comprises coating the wire with a wire enamel consisting of a solution of a composition comprising a mixture of a superpolyamide and from 5 to 50 per cent by weight of the mixture of a compatible, heat-hardenable, alkaline-catalyzed cresol-formaldehyde resin, and baking the coated wire to convert the applied enamel into a hard, flexible, tough, abrasion-resistant insulation.

10. An insulated electrical conductor comprising a metallic conductor insulated with a coating which is the product of heat treating in place a mixture of, by weight, approximately 2 parts of a superpolyamide and 1 part of a compatible heat-hardenable phenol-aldehyde resin, the said coating being hard, flexible, tough and abrasion-resistant.

11. A wire enamel as in claim 3 in which the volatile solvent comprises an organic hydroxy compound.

12. A wire enamel as in claim 3 in which the volatile solvent comprises a mixture of a hydrocarbon and an organic hydroxy compound.

13. A wire enamel as in claim 4 in which the volatile solvent comprises a volatile phenolic body.

14. A wire enamel as in claim 4 in which the volatile solvent comprises a mixture of coal-tar naphtha and cresol.

15. A wire enamel comprising a cresol solution of a mixture of a superpolyamide and from 5 to 50 per cent, by weight of the mixture, of a compatible, heat-hardenable, alkaline-catalyzed cresol-formaldehyde resin.

16. A wire enamel comprising a cresol solution of, by weight, approximately 2 parts of a superpolyamide and approximately 1 part of a compatible, heat-hardenable, alkaline-catalyzed cresol-formaldehyde resin.

17. An insulated electrical conductor comprising a metallic conducting core and insulation thereon comprising a hard, flexible, tough, abrasion-resistant material obtained by heat treating in place a composition containing a superpolyamide and a heat-hardenable resinous condensation product of a phenol and an aldehyde.

18. An electrical cable comprising a metallic conducting core provided with insulation comprising the hard flexible, tough, abrasion-resistant product of heat treating in place a mixture containing a superpolyamide and a heat-hardenable resinous condensation product of a phenol and formaldehyde.

19. Copper wire insulated with a hard, flexible, tough, abrasion-resistant coating of high dielectric strength, said coating comprising the product of heat treating in place a mixture of a superpolyamide and from 5 to 50 per cent by weight of the said mixture of a heat-hardenable resinous condensation product of a phenol and formaldehyde.

HENRY A. SMITH.
EDWARD H. JACKSON.